United States Patent [19]

Shyr et al.

[11] Patent Number: 4,656,230

[45] Date of Patent: Apr. 7, 1987

[54] HYDROGENATION PROCESS

[75] Inventors: Yen-Shin Shyr; Rex L. Bobsein; Marvin M. Johnson, all of Bartlesville, Okla.

[73] Assignee: Phillips Petroleum Company, Bartlesville, Okla.

[21] Appl. No.: 754,388

[22] Filed: Jul. 12, 1985

[51] Int. Cl.$^4$ .............................................. C08F 8/04
[52] U.S. Cl. ................................. 525/338; 525/332.2; 525/332.8; 525/332.9; 525/339
[58] Field of Search ................................. 525/338, 339

[56] References Cited

U.S. PATENT DOCUMENTS

| | | | |
|---|---|---|---|
| 1,997,135 | 4/1935 | de Mahler ............................. | 23/236 |
| 3,040,009 | 6/1962 | Wadsworth et al. ................. | 260/82 |
| 3,793,306 | 2/1974 | Farrar et al. ........................ | 260/85.1 |
| 3,937,759 | 2/1976 | Baumgartner et al. ............. | 525/338 |
| 4,021,484 | 5/1977 | Toda et al. ........................... | 525/338 |

Primary Examiner—Joseph L. Schofer
Assistant Examiner—Bernard Lipman
Attorney, Agent, or Firm—A. W. Umphlett

[57] ABSTRACT

Process of preventing and/or reducing the rate of catalyst deactivation during hydrogenation of olefinic materials, especially olefinic polymers such as diene-containing polymers, that contain contaminants and/or catalyst poisons which comprises carrying out the hydrogenation in the presence of a small but finite amount of a lower alkanol, such as methanol, which amount is sufficient to substantially reduce catalyst poisoning due to contaminants present in the hydrogenation feed.

9 Claims, No Drawings

HYDROGENATION PROCESS

BACKGROUND OF THE INVENTION

This invention relates to a process for hydrogenating unsaturated materials using a carrier-supported heterogeneous catalyst system. In accordance with another aspect, this invention relates to a process of preventing or reducing the rate of catalyst deactivation during hydrogenation of olefinic materials that contain contaminants and catalyst poisons. In accordance with a further aspect, this invention relates to a process for the hydrogenation of olefin polymers, especially diene-containing polymers, in the presence of a heterogeneous catalyst system in a fixed-bed reactor wherein hydrogenation is carried out in the presence of alcohol to reduce or substantially eliminate catalyst deactivation due to contaminants present in the hydrogenation feed.

There are known two types of catalysts which are useable for the hydrogenation reaction of polymers, namely (1) the so-called Ziegler type homogeneous system catalyst, and (2) carrier-supported catalysts in which a metal such as nickel, palladium, ruthenium, or the like, is supported on a carrier such as carbon, alumina, silica, silica-alumina, diatomaceous earth, and the like. Catalysts composed of metals of group VIII of the Periodic Table supported on a refractory oxide carrier have generally been used to catalyse hydrogenation of the carbon-carbon double bond present in various unsaturated materials, especially olefin polymers and particularly conjugated diene polymers. The hydrogenation of diene-containing polymers, such as butadiene-styrene copolymers and the like, yield substances of greater saturation and consequently greater stability when used for certain applications. The heterogeneous catalysts which are used in the fixed-bed reaction system often encounter catalyst poisoning problems due to the presence of various contaminants contained in the hydrogenation feed.

There is a continuing effort to develop improved processes to selectively hydrogenate unsaturated materials, particularly olefin polymers and especially diene-containing polymers, to produce polymeric products having desirable properties. The present invention is directed to a process of preventing or reducing the rate of catalyst deactivation during hydrogenation of olefinic materials, particularly diene polymers, containing contaminants and catalyst poisons.

Accordingly, an object of this invention is to provide an improved process for the hydrogenation of unsaturated polymers using heterogeneous catalyst systems.

Another object of this invention is to provide an additive or inhibitor to prevent or reduce the rate of catalyst deactivation during hydrogenation.

Other objects, aspects, as well as the several advantages of the invention will be apparent to those skilled in the art upon reading the specification and the appended claims.

SUMMARY OF THE INVENTION

In accordance with the invention, a process of substantially preventing and reducing the rate of catalyst deactivation during hydrogenation of olefinic materials containing contaminants and/or catalyst poisons is provided which comprises carrying out hydrogenation in the presence of a small but effective amount of at least one lower alkanol, which amount is sufficient to substantially reduce catalyst poisoning due to such contaminants.

It has been found that the addition of at least one lower alkanol, such as methanol, to heterogeneous hydrogenation catalysts and/or to the hydrogenation system feed or to the hydrogenation reaction zone significantly reduces catalyst poisoning due to contaminants present in the hydrogenation feed.

The alkanol can be introduced into the hydrogenation system by several methods to restore and stabilize catalyst activity of the catalyst as follows:

(1) The activity of aged heterogeneous hydrogenation catalysts can be restored to initial level by washing with alcohol solution, (2) the activity of heterogeneous hydrogenation catalysts can be maintained at the initial level without poisoning by adding small finite amounts of at least one lower alkanol to the hydrogenation feed, and (3) the activity of heterogeneous hydrogenation catalysts can remain at the initial level during hydrogenation for extended periods by prewashing the catalyst with a lower alkanol such as methanol prior to hydrogenation.

DETAILED DESCRIPTION OF THE INVENTION

In the discussion hereafter for simplicity and convenience we direct the invention as being applicable to olefin polymers, especially diene-containing polymers, but it should be understood that the invention is equally applicable to other unsaturated materials containing contaminants and catalyst poisons which normally would be subjected to hydrogenation with a carrier-supported heterogeneous hydrogenation catalyst.

CATALYSTS

The catalyst compositions useful for the hydrogenation reaction of the invention are well known and comprise a heterogeneous solid particulate catalyst comprising a solid particulate support selected from refractory inorganic oxides and at least one metal, preferably selected from Group VIII metals and other metals such as manganese, chromium, copper, tin, zinc, silver, and the like, and mixtures thereof. The presently preferred catalyst for the hydrogenation of diene polymers in the present process is a nickel-silica catalyst composition.

OLEFIN POLYMERS

The polymers or polymer substrates to be hydrogenated in accordance with the invention are generally olefin polymers which can be either quenched or living polymers. Preferably, the olefin polymer feeds are diene-containing polymers and copolymers with vinyl aromatic/diene copolymers highly preferred.

Useful diene moieties include any conventional polyunsaturated monomers having from about 3 to about 12 carbon atoms. Butadiene is preferred. Useful aromatic monomers include mono- and polyvinyl-substituted aromatic compounds. Styrene and divinylbenzene are preferred with styrene highly preferred. Mixtures of vinyl aromatic and/or diolefin monomers can be used along with the optional inclusion of conventional olefinic monomers of other types in the preparation of the polymeric substrates.

The relative quantities of aromatic and diene monomers used in preparing aromatic-diene copolymers for use as hydrogenation feeds herein will generally lie between about 10 weight percent to about 90 percent with about 40 to about 75 preferred for aromatic monomers and between about 10 percent and 90 percent with about 40 to about 75 preferred for diene monomers. The optional inclusion of other monomers is also contemplated. Mixtures of polymeric substrates can be employed.

In accordance with another aspect of the invention, "living", for example, Li-terminated polymers are used as disclosed in U.S. Pat. No. 4,145,298, which is incorporated herein by reference. In that patent nitrogen-containing copolymers are prepared by the reaction of lithiated hydrogenated conjugated diene-monovinylarene copolymers with nitrogen-containing organic compounds.

The olefinic polymer, such as conjugated diene polymers, can be hydrogenated as such. Good results, however, can be obtained when the polymer is used in the form of a solution. The concentration of polymer in solution is usually about 1 to about 75 percent by weight, preferably about 1 to about 40 percent by weight. Any solvent which does not adversely affect the hydrogenation catalyst and can dissolve the polymer to be hydrogenated can be used to provide the polymer solution. Solvents that can be employed include benzene, toluene, xylenes, hexane, cyclohexane, acetone, methylethylketone, ethyl acetate, and the like, and mixtures thereof. Polymers prepared by solution polymerization can be used as such for hydrogenation.

HYDROGENATION CONDITIONS

The hydrogenation reaction is carried out using quantities of hydrogen necessary to react with significant numbers of the unsaturated bonds present in the polymeric substrate. Generally, hydrogenation of trans unsaturation, vinyl unsaturation, and styrene unsaturation will take place during the hydrogenation reaction. By "styrene unsaturation" applicants mean aromatic unsaturation present in the ring structure of any aromatic component, e.g., styrene. Typically, about 95%, and preferably about 100%, of the olefinic (i.e., trans and vinyl) unsaturation will be hydrogenated, with about 5%, and preferably about 0%, of the aromatic unsaturation being hydrogenated as well.

Hydrogen or hydrogen-containing reactant(s) will be supplied to the reaction at pressures and other reaction conditions sufficient to cause hydrogenation of the materials being hydrogenated. Preferably, the hydrogenation reaction takes place at a temperature in the range of about 100°–200° C. and about 200–700 psig $H_2$ pressure over a period of about one half hour to about twelve hours, with hydrogenation times of about 3 to about 5 hours preferred. While hydrogen gas is a preferred source of hydrogen atoms for the reaction, other conventional hydrogen donors are operable herein. Mixtures of hydrogen sources can be employed.

The reaction vessel employed in the process of the invention is generally any vessel which will afford efficient contacting of the catalyst composition with the reactants, i.e, the hydrogen source(s) and polymer substrate(s) to be used. Broadly, the temperature can range from about 50° to about 200° C. and the pressure can range from about 100 to about 700 psig. It is preferred to carry out the hydrogenation reaction in a fixed-bed reaction zone containing supported heterogeneous hydrogenation catalyst. The catalyst can be contacted either with a down-flow or up-flow passage of polymer in solution to be hydrogenated. It has been found the up-flow process is preferred. The liquid hourly space velocity (LHSV) of the polymer solution can range from about 0.1 to about 1 cc/cc catalyst/hour.

The polymers of the invention can be hydrogenated directly in their normal non-viscous to viscous form, or they, as well as solid polymers, can be hydrogenated in the form of a solution or a dispersion in a suitable solvent which preferably is not hydrogenatable. In cases where the polymeric material is dissolved in a solvent, it is somewhat more economical to separate the polymeric material after hydrogenation and reuse the solvent. The hydrogenation is preferably carried out in a continuous process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The extent of hydrogenation of the olefinic bonds and of the phenyl groups in the polymers treated can be determined by infrared analysis before and after hydrogenation.

ALKANOL ADDITION

As indicated hereinbefore the invention comprises the addition of a lower alkanol, such as methanol, to the hydrogenation reaction. It is presently preferred to introduce the alkanol into the hydrogenation reaction either directly or by way of the hydrogenation feed. It is also within the scope of the invention to pretreat the catalyst with alkanol prior to hydrogenation as well as treating deactivated catalyst with alkanol to rejuvenate.

The amount of alkanol present during hydrogenation will be a small finite amount sufficient to substantially prevent and/or reduce the rate of catalyst deactivation during hydrogenation. This amount ordinarily will range from about 0.01 to about 0.5 volume percent in the polymer solution. Suitable alkanols that can be used include methanol, ethanol, propanol, and the like, and other alcohols having up to and including a total of about 5 carbon atoms.

The method of preventing and/or reducing the rate of catalyst deactivation during hydrogenation of olefinic polymers that contain lithium hydride (catalyst poison) by addition of a small concentration of methanol to the solution of polymer feed is illustrated in the following examples.

The following examples are presented in further illustration of the invention.

EXAMPLE I

The catalyst for the hydrogenation was prepared by impregnating +20 mesh pellets of Hi-Sil silica (PPG Industries, Inc. BET/$N_2$ surface area: 140–160 $m^2/g$; moisture loss at 221° F.: 3–7 weight percent; pH of 5% water slurry: 6.5–7.3) with a methanolic solution of nickel nitrate. A solution of 94 g $Ni(NO_3)_2.6H_2O$ in 600 mL methanol was added to 150 g Hi-Sil; the volume of solution was just sufficient to wet completely the silica. Methanol was permitted to evaporate at ambient temperatures and the dried preparation was reduced by heating to 370° C. in flowing hydrogen. The reduced catalyst contained 11.2 wt. percent nickel. About 149 g was placed in a 1½ in. schedule 80 stainless steel pipe reactor 24 in. in length supported on 100 mL of alpha alumina granules and covered with 20 mL of granules. After being installed in the reactor, the catalyst was washed with 300 mL methanol and 1500 mL cyclohexane. A solution of butadiene-styrene copolymer ($M_n \approx 50,000$; butadiene content: 40 weight percent) at a concentration of 12.6 wt. percent in cyclohexane was pumped upflow through the reactor at a rate of about 150 mL per minute in the presence of 3-4 L/hr added hydrogen. Reactor pressure was maintained at 500 psig pressure and catalyst temperature was about 160° C. during 251 hours of nearly continuous operation. Samples of hydrogenated polymer solution were analyzed periodically by infra-red spectrometry for trans olefin unsaturation.

TABLE I

| Sample No. | Time on stream, hrs | % Trans unsat. |
|---|---|---|
| 1 | 0 | 0.44 |
| 2 | 18 | 0.64 |
| 3 | 23 | 0.61 |
| 4 | 90 | 1.48 |
| 5 | 95 | 1.52 |
| 6 | 95 | 0.56 |
| 7 | 112 | 1.24 |
| 8 | 136 | 2.78 |
| 9 | 163 | 4.45 |
| 10 | 234 | 7.60 |
| 11 | 240 | 6.56 |
| 12 | 251 | 2.97 |

The run was interrupted temporarily after sample #5 was taken to unplug some reactor components. After sample #10 was taken, feed containing 0.1 vol. percent methanol was introduced to the reactor. This increased the activity of the catalyst as shown by the decreasing concentration of trans olefin in the polymer. The run was stopped permaturely because of a power outage.

EXAMPLE II

Use of a polymer solution containing a small concentration of methanol in an extended hydrogenation run is shown in this example. The catalyst was nickel on Hi-Sil silica prepared in the same way as the catalyst in the preceding example but contained 14.7 wt. % nickel. After impregnation and drying 600 mL of catalyst was placed in the pipe reactor of Example I and reduced under 50 normal L/hr hydrogen gas at 70 psig pressure while being heated from ambient temperature to 370° C. in four hours; the catalyst was held at that temperature for 21 additional hours. After being cooled to about 100° C. a solution of butadiene-styrene copolymer as used in Example I but to which 0.5 volume % of methanol has been added was pumped upflow through the reactor in a run that lasted 1090 hours. During that time the catalyst temperature ranged between 60°-90° C., polymer solution was fed at between 0.17-0.43 LHSV, the pressure ranged between 150-300 psig, and hydrogen was added at a rate of about 3 L/hr. During the run, 33 samples of hydrogenated polymer were analyzed by infra-red spectroscopy for trans olefin content. Except for one sample all results during the run lasting 1090 hours showed less than 2 percent trans olefin content, which is the specified maximum for the viscosity index improver for which the hydrogenated polymer is used. The one exception, which showed 16% trans olefin concentration, was the result of a cessation in hydrogen flow. The sustained activity of this catalyst, in contrast to the decreased activity shown in Example I, is attributed to the presence of added methanol in the polymer solution. It is believed that the methanol prevents accumulation of lithium hydride on the hydrogenation catalyst which tends to poison it.

That which is claimed is:

1. In a process for the solution hydrogenation of olefinically unsaturated compounds chosen from the group consisting of copolymers of diene monomer with mono- or polyvinyl substituted aromatic compounds with gaseous or dissolved hydrogen in the presence of supported heterogeneous solid particulate hydrogenation catalysts comprising a solid particulate support selected from refractory inorganic oxides and at least one metal selected from Group VIII metals, manganese, chromium, copper, tin, zinc, silver and mixtures thereof, the improvement for substantially preventing and reducing the rate of catalyst deactivation due to contaminants present in the hydrogenation feed solution which comprises carrying out hydrogenation in the presence of an amount of at least one lower alkanol sufficient to inhibit catalyst poisoning.

2. A process according to claim 1 wherein the alkanol is present in the hydrogenation feed.

3. A process according to claim 1 wherein the catalyst is pretreated with an alkanol prior to hydrogenation.

4. A process according to claim 1 wherein the alkanol is methanol and the copolymer is a butadiene-styrene copolymer.

5. A process according to claim 1 wherein the amount of alkanol present ranges from about 0.01 to about 0.5 volume percent in said solution.

6. A process according to claim 1 wherein a solution of diene polymer is subjected to hydrogenation with a nickel silica catalyst.

7. A process according to claim 6 wherein the polymer solution is a butadiene-styrene copolymer in solution in cyclohexane.

8. A process according to claim 7 wherein the alkanol is methanol.

9. A process according to claim 7 wherein the polymer solution is passed upwardly through a fixed-bed of nickel-silica catalyst.

* * * * *